United States Patent
Oguchi et al.

(10) Patent No.: US 9,819,218 B2
(45) Date of Patent: Nov. 14, 2017

(54) POWER CONDITIONER SYSTEM AND POWER-STORAGE POWER CONDITIONER

(71) Applicants: KYOCERA CORPORATION, Kyoto (JP); NICHICON CORPORATION, Kyoto (JP)

(72) Inventors: Tomihiro Oguchi, Fuefuki (JP); Tomonari Kusunose, Higashiomi (JP); Masaomi Satake, Yokohama (JP)

(73) Assignees: KYOCERA CORPORATION, Kyoto (JP); NICHICON CORPORATION, Kyoto (JP)

( * ) Notice: Subject to any disclaimer, the term of this patent is extended or adjusted under 35 U.S.C. 154(b) by 825 days.

(21) Appl. No.: 14/348,549

(22) PCT Filed: Sep. 25, 2012

(86) PCT No.: PCT/JP2012/006079
§ 371 (c)(1),
(2) Date: Mar. 28, 2014

(87) PCT Pub. No.: WO2013/046638
PCT Pub. Date: Apr. 4, 2013

(65) Prior Publication Data
US 2014/0217826 A1 Aug. 7, 2014

(30) Foreign Application Priority Data
Sep. 28, 2011 (JP) .................................. 2011-213081

(51) Int. Cl.
*H02J 3/32* (2006.01)
*H02J 3/38* (2006.01)
(Continued)

(52) U.S. Cl.
CPC ........ *H02J 7/34* (2013.01); *H02J 3/32* (2013.01); *H02J 3/383* (2013.01); *H02J 7/35* (2013.01);
(Continued)

(58) Field of Classification Search
CPC ........ H02J 1/12; H02J 3/32; H02J 3/383; H02J 7/34; H02J 7/35; H02J 9/06;
(Continued)

(56) References Cited

U.S. PATENT DOCUMENTS 7,235,891 B2   6/2007   Tokiwa et al.
8,558,510 B2   10/2013  Moon
(Continued)

FOREIGN PATENT DOCUMENTS

CN   1491474 A      4/2004
JP   10-023671 A    1/1998
(Continued)

OTHER PUBLICATIONS

Office Action dated Aug. 4, 2015, issued in counterpart Japanese application No. 2014-214077.
(Continued)

*Primary Examiner* — Levi Gannon
(74) *Attorney, Agent, or Firm* — Procopio Cory Hargreaves and Savitch LLP

(57) ABSTRACT

A power conditioner system includes a power-generation power conditioner 30 for connecting a power generation equipment 11 to a grid 12 and a power-storage power conditioner 50 for connecting a power storage equipment 13 to the grid 12, wherein the power conditioner 30 includes an independent-power-generation output unit 34 for outputting, separately from power supply to the grid 12, power based on power of the power generation equipment 11, and the power conditioner 50 includes an independent-power-storage output unit 54 for outputting, separately from power supply to the grid 12, power based on power in the power storage equipment 13. The power conditioner 50 supplies at least one of AC power based on the output of the independent-power-generation output unit 34, AC power based on the
(Continued)

output of the independent-power-storage output unit 54, and system power of the grid 12, to an independent output system 62 having a predetermined load.

12 Claims, 11 Drawing Sheets

(51) Int. Cl.
 *H02J 7/35* (2006.01)
 *H02J 7/34* (2006.01)
 *H02J 3/00* (2006.01)
(52) U.S. Cl.
 CPC ....... *H02J 2003/007* (2013.01); *Y02E 10/563* (2013.01); *Y02E 10/566* (2013.01); *Y02E 60/76* (2013.01); *Y02E 70/30* (2013.01); *Y04S 40/22* (2013.01); *Y10T 307/328* (2015.04); *Y10T 307/344* (2015.04); *Y10T 307/359* (2015.04); *Y10T 307/516* (2015.04)
(58) Field of Classification Search
 CPC ..... Y02E 10/563; Y02E 10/566; Y02E 70/30; Y10T 307/328; Y10T 307/344; Y10T 307/359; Y10T 307/516
 USPC .............. 307/21, 23, 25, 46, 64, 80, 82, 126
 See application file for complete search history.

(56) References Cited

U.S. PATENT DOCUMENTS

| | | | |
|---|---|---|---|
| 8,710,699 B2* | 4/2014 | Binder | H02J 3/383 307/64 |
| 9,509,149 B2* | 11/2016 | Kusunose | H02J 3/32 |
| 2004/0032127 A1 | 2/2004 | Tokiwa et al. | |
| 2005/0006958 A1* | 1/2005 | Dubovsky | H02J 3/382 307/64 |
| 2005/0012395 A1 | 1/2005 | Eckroad et al. | |
| 2008/0088183 A1 | 4/2008 | Eckroad et al. | |
| 2009/0152947 A1* | 6/2009 | Wang | H02J 1/14 307/24 |
| 2009/0273240 A1* | 11/2009 | Gurunathan | H02J 9/062 307/64 |
| 2011/0115295 A1* | 5/2011 | Moon | H02J 3/32 307/65 |
| 2011/0133555 A1* | 6/2011 | Choi | H02J 3/383 307/65 |
| 2011/0133556 A1* | 6/2011 | Choi | H02J 3/383 307/65 |
| 2011/0140667 A1 | 6/2011 | Moon | |
| 2011/0148205 A1* | 6/2011 | Moon | H02J 3/32 307/65 |
| 2012/0126623 A1* | 5/2012 | Koehl | H02J 3/383 307/76 |
| 2012/0188806 A1* | 7/2012 | Tamura | H02J 3/383 363/95 |
| 2012/0267957 A1* | 10/2012 | Czarnecki | H02J 3/02 307/64 |
| 2013/0088900 A1* | 4/2013 | Park | H02J 9/062 363/71 |
| 2014/0217826 A1 | 8/2014 | Oguchi et al. | |

FOREIGN PATENT DOCUMENTS

| | | |
|---|---|---|
| JP | 2002-247765 A | 8/2002 |
| JP | 2007-049770 A | 2/2007 |
| JP | 2007-124811 A | 5/2007 |
| JP | 2008-042999 A | 2/2008 |
| JP | 2008-253033 A | 10/2008 |
| JP | 2010-130836 A | 6/2010 |
| KR | 10-2011-0066646 A | 6/2011 |
| WO | 2004/054065 A1 | 6/2004 |
| WO | 2011068133 A1 | 6/2011 |
| WO | 2013046638 A1 | 4/2013 |

OTHER PUBLICATIONS

Office Action dated Sep. 25, 2015, issued in counterpart Chinese application No. 201280047772.X.
Office Action dated Mar. 9, 2016, issued in counterpart Korean application No. 2014-7011167.
Office Action dated Sep. 7, 2015, issued in counterpart Korean application No. 2014-7011167.
The extended European search report issued by the European Patent Office dated May 7, 2015, which corresponds to European Patent Application No. 12835434.7-1804 and is related to U.S. Appl. No. 14/348,549.
International Search Report; PCT/JP2012/006079; dated Dec. 18, 2012.

* cited by examiner

POWER CONDITIONER SYSTEM AND POWER-STORAGE POWER CONDITIONER

CROSS REFERENCE TO RELATED APPLICATION

This application claims priority to and the benefit of Japanese Patent Application No. 2011-213081 filed on Sep. 28, 2011, the entire contents of which are incorporated herein by reference.

FIELD

The present invention relates to a power conditioner system, and more specifically, to a novel power conditioner system that includes a combination of a power-generation power conditioner of a power generation system and a power-storage power conditioner of a power storage system, and also to the power-storage power conditioner.

BACKGROUND

As a power-generation power conditioner of a power generation system including a power generation equipment such as solar panels and the like, there has been known a power conditioner that allows a system interconnection operation for outputting AC power by interconnecting with a commercial power supply grid-system (hereinafter, appropriately abbreviated as a grid) and an independent operation for outputting the AC power without involving the grid (for example, see Patent Document 1).

Also, there has been known a power-storage power conditioner of a power storage system having a storage facility such as a storage battery or the like which is charged by power from the grid that, in a manner similar to the power-generation power conditioner described above, allows the grid interconnection operation for outputting the AC power by interconnecting with the grid and the independent operation for outputting the AC power without involving the grid (for example, see Patent Document 2).

CITATION LIST

Patent Document 1: Japanese Unexamined Patent Application Publication No. 2007-049770
Patent Document 2: Japanese Unexamined Patent Application Publication No. 2008-253033

SUMMARY OF INVENTION

Incidentally, in order to deal securely with power failure or the like of the grid, it is desired to install both of the power generation system and the power-storage system described above. In this case, however, it is assumed that simple installment of the power-generation power conditioner and the power-storage power conditioner separately from each other may cause the following disadvantages.

For example, when the power-generation power conditioner is focused on, in case of the grid power failure, an major load needs to be made offline from a system outlet connected to the grid and connected to an independent outlet connected to an independent output terminal of the power-generation power conditioner, that is, the major load requires a connection change, which is troublesome. Moreover, when solar panels are in use as the power generation equipment, since an output thereof depends on an amount of solar radiation, the major load may not be stably powered regardless of change of its connection to the independent outlet. Especially, when the grid power failure occurs during nighttime, power generated during daytime is unavailable and thus the major load may not be powered. Also, even when the grid power failure is not occurred, at the time of output suppression due to an increase in a system voltage, date/time designated by a calendar function, or an offline instruction by a PCS (Power Conditioner Subsystem) communication, the generated power is bound to be discarded, wasting generated power energy.

Also, when the power-storage power conditioner is focused on, an output may be stably supplied from the power storage equipment to the independent outlet connected to the independent output terminal of the power-storage power conditioner. However, in case of the grid power failure, in the same manner as the power-generation power conditioner, the trouble of changing connection of the major load from the grid outlet to the independent outlet of the power-storage power conditioner is required. In case of the grid power failure, further, since the power generation equipment is made offline from the grid, the power generated by the power generation equipment may not be stored in the power storage equipment, wasting the generated power energy.

The present invention in view of the above problems is primarily to provide a power conditioner system and a power-storage power conditioner that allow power supply to the major load in case of the grid power failure without requiring the trouble of changing connection of the major load.

In order to achieve the above matter, a power conditioner system according to the present invention includes a power-generation power conditioner configured to connect a power generation equipment to a grid and a power-storage power conditioner configured to connect a power storage equipment to the grid, such that the power-generation power conditioner includes an independent-power-generation output unit configured to output, separately from power supply to the grid, power based on generated power of the power generation equipment, the power-storage power conditioner includes an independent-power-storage output unit configured to output, separately from power supply to the grid, AC power based on stored power in the power storage equipment, and the power-storage power conditioner supplies at least one of AC power based on the output power of the independent-power-generation output unit, AC power based on the output power of the independent-power-storage output unit, and system power of the grid, to an independent output system having a predetermined load connected thereto.

According to one embodiment of the present invention, the power-storage power conditioner further includes an independent-power-generation input unit configured to input the power supplied from the independent-power-generation output unit and utilizes the power supplied from the independent-power-generation input unit for power storage of the power-storage power conditioner or for power supply to the independent-power-storage output unit.

According to one embodiment of the present invention, the power-generation power conditioner and the power-storage power conditioner include respective communication units for transmitting and receiving information including an operation state.

According to one embodiment of the present invention, the power-storage power conditioner charges the power storage equipment based on the output power of the independent-power-generation output unit.

According to one embodiment of the present invention, the power-storage power conditioner, when supplying the AC power based on the output power of the independent-power-generation output unit to the independent output system and the AC power is smaller than power consumption of the independent output system, compensates such a shortage with the AC power based on the output power of the independent-power-storage output unit.

According to one embodiment of the present invention, the power-storage power conditioner, when supplying the AC power based on the output power of the independent-power-generation output unit to the independent output system and the AC power exceeds the power consumption of the independent output system, stores such an excess in the power storage equipment.

According to one embodiment of the present invention, the power-generation power conditioner, at the time of suppression of output to the grid, makes itself offline from the grid and outputs power based on generated power of the power generation equipment from the independent-power-generation output unit and transmits information pertinent to the output suppression from the communication unit of the power-generation power conditioner to the power-storage power conditioner.

According to one embodiment of the present invention, the power-storage power conditioner, when the communication unit thereof receives the information pertinent to the output suppression from the power-generation power conditioner, makes itself offline from the grid and stores the output power of the independent-power-generation output unit in the power storage equipment.

According to one embodiment of the present invention, the power-generation power conditioner is subjected to output suppression upon increase in a system voltage of the grid, upon entering date/time designated by a calendar function, or upon an offline instruction received by the communication unit of the power-generation power conditioner itself.

According to one embodiment of the present invention, the power-generation power conditioner, when making itself offline from the grid, transmits information including the operation state from the communication unit thereof to the power-storage power conditioner and outputs power based on generated power of the power generation equipment from the independent-power-generation output unit.

According to one embodiment of the present invention, the power-generation power conditioner transmits information about power based on the generated power of the power generation equipment from the communication unit thereof to the power-storage power conditioner, and the power-storage power conditioner, when the communication unit thereof receives the information about the power based on the generated power of the power generation equipment from the power-generation power conditioner, controls a charging amount of the power storage equipment based on the received information.

According to one embodiment of the present invention, the power-storage power conditioner, when detecting connection of the independent-power-generation output unit to the power-storage power conditioner, supplies at least one of the AC power based on the output power of the independent-power-generation output unit, the AC power based on the output power of the independent-power-storage output unit, and the system power of the grid, to a predetermined independent output system.

Further, in order to achieve the above object, a power-storage power conditioner according to the present invention configured to connect a power storage equipment to a grid, includes:

an independent-power-storage output unit configured to output, separately from power supply to the grid, power based on stored power in the power storage equipment, wherein the power-storage power conditioner supplies at least one of AC power of the power-generation power conditioner, AC power based on the output power of the independent-power-storage output unit, and system power of the grid, to an independent output system having a predetermined load connected thereto.

According to the present invention, a power conditioner system and a power-storage power conditioner that, in case of the grid power failure, may supply power to an major load without requiring the trouble of changing connection of the major load may be provided.

DESCRIPTION OF EMBODIMENTS

The following is a description of embodiments of the present invention with reference to the accompanying drawings.

(First Embodiment)

Figure 1:
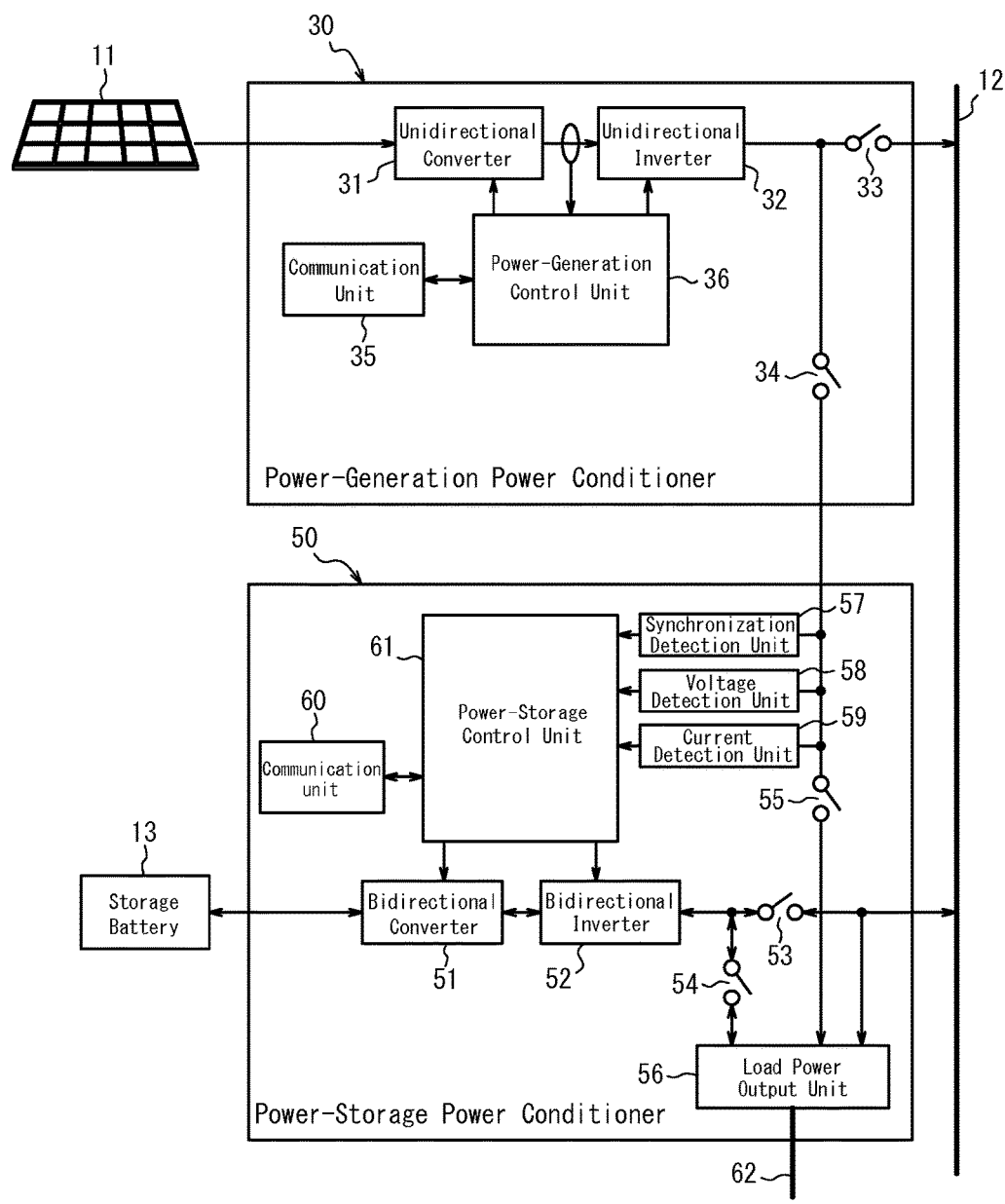
FIG. 1 is a block diagram illustrating a schematic configuration of a power conditioner system according to a first embodiment of the present invention.

FIG. 1 is a block diagram illustrating a schematic configuration of a power conditioner system according to a first embodiment of the present invention. The power conditioner system according to the present embodiment includes a power-generation power conditioner 30 for connecting a power generation equipment 11 to a commercial power supply system (grid) 12 and a power-storage power conditioner 50 for connecting a power storage equipment 13 to the grid 12. Note that, according to the present embodiment, the power generation equipment 11 is configured by using a solar panel, and the power-generation power conditioner 30 is configured by using a solar power conditioner. Also, the power storage equipment 13 is configured by using a storage battery such as a lithium-ion battery, nickel-metal hydride battery or the like.

The power-generation power conditioner 30 includes a unidirectional converter 31, a unidirectional inverter 32, a system interconnection switch 33, an independent output switch 34, a communication unit 35, and a power generation control unit 36. The unidirectional converter 31 boosts a DC output voltage generated from the power generation equipment 11 and supplies the boosted DC output voltage to the unidirectional inverter 32. An output voltage of the unidirectional converter 31 is detected as information about power based on generated power of the power generation equipment 11 (intermediate link information) by the power generation control unit 36.

The unidirectional inverter 32 converts the DC voltage boosted by the unidirectional converter 31 into an AC current and supplies the AC current to the grid interconnection switch 33 and the independent output switch 34. The grid interconnection switch 33 selectively reverses flow of the AC power output from the unidirectional inverter 32 to the grid 12. The independent output switch 34 serves as an independent-power-generation output unit and selectively outputs the AC power output from the unidirectional inverter 32 as an AC link output to the power-storage power conditioner 50. Note that a central value of the output voltage of the sunlight-power-generation and the power-storage power conditioner interconnecting with single-phase three-wire 200 V (the grid interconnection switch 33 being closed, and the independent output switch 34 being open) is 202 V. Also, a central value of the output voltage at the time of output of independent power generation (the grid interconnection switch 33 being open, and the independent output switch 34 being closed) is 101 V.

The control unit 35 communicates with a communication unit 60 of the power-storage power conditioner 50, which will be described below, by either wired or wireless, in a direct manner or via a network. The communication unit 35 transmits information about an operation state including a voltage state inside the power-generation power conditioner 30 and the like to the communication unit 60 and, also, receives information including an operation state of a voltage state inside the power-storage power conditioner 50 from the communication unit 60. Note that the information received by the communication unit 35 includes an offline instruction by a PCS communication and the like.

The power generation control unit 36 is configured by using, for example, a microcomputer. The power generation control unit 36, based on a state such as an increase in a system voltage or power failure of the grid 12, as well as the information received by the communication unit 35 and the like, controls an operation of each of the unidirectional converter 31, the unidirectional inverter 32, the grid interconnection switch 33, the independent output switch 34, and the communication unit 35. Note that the grid interconnection switch 33 and the independent output switch 34 are separately controlled to be turned on/off by respective relays.

The power-storage power conditioner 50 includes a bidirectional converter 51, a bidirectional inverter 52, a system interconnection switch 53, an independent output switch 54, an AC link switch 55, a load power output unit 56, a synchronization detection unit 57, a voltage detection unit 58, a current detection unit 59, a communication unit 60, and a power-storage control unit 61. The bidirectional converter 51 boosts a DC output voltage from the power storage equipment and supplies the boosted DC output voltage to the bidirectional inverter 52. Also, the bidirectional converter 51 steps down the DC voltage converted by the bidirectional inverter 52 and supplies the stepped-down DC voltage to the power storage equipment 13. Thereby, the power storage equipment 13 is charged.

The bidirectional inverter 52 converts the DC voltage boosted by the bidirectional converter 51 into an AC voltage and supplies the AC voltage to the independent output switch 54. The grid interconnection switch 53 selectively outputs the AC power output from the bidirectional inverter 52 to a general load. Also, the bidirectional inverter 52 converts the grid voltage from the grid 12 input via the grid interconnection switch 53 into a DC current and supplies the DC current to the bidirectional converter 51.

The grid interconnection switch 53 connects/disconnects the grid 12 and the bidirectional inverter 52. The independent output switch 54 serves as an independent-power-storage output unit and selectively supplies the AC power output from the bidirectional inverter 2 to the load power output unit 56. Also, the independent output switch 54 selectively supplies the AC link output from the power-generation power conditioner 30 to the bidirectional inverter 52.

The AC link switch 55 corresponds to an independent-power-generation input unit and selectively supplies the AC link output from the power-generation power conditioner 30 to the load power output unit 56. To the load power output unit 56, a system power of the grid 12, the AC link output from the power-generation power conditioner 30 output via the AC link switch 55, and the AC output power of the bidirectional inverter 52 output via the independent output switch 54 are input. Then, the load power output unit 56 selects at least one of the three types of the input power described above and supplies the selected AC power to an independent output system 62 having an independent outlet having an major load connected thereto.

The synchronization detection unit 57, the voltage detection unit 58 and the current detection unit 59 detect synchronization, a voltage and a current, respectively, of the AC link output from the power-generation power conditioner 30. Results of the detection are supplied to the power-storage control unit 61. The communication unit 60, by communicating with the communication unit 35 of the power-generation power conditioner 30 described above, transmits the operation state including the voltage state inside the power-storage power conditioner 50 and receives the information transmitted from the communication unit 35.

The power-storage control unit 61 is configured by using, for example, a microcomputer. The power-storage control unit 61, based on the state such as an increase in the grid voltage or power failure of the grid 12, and the results of the detection of the AC link output detected by the synchronization detection unit 57, the voltage detection unit 58 and the current detection unit 59, as well as the information received by the communication unit 60 and the like, controls an operation of each of the bidirectional converter 51, the bidirectional inverter 52, the grid interconnection switch 53, the independent output switch 54, the AC link switch 55, the load power output unit 56, and the communication unit 60. Note that the grid interconnection switch 53, the independent output switch 54, and the AC link switch 55 are controlled to be turned on/off by respective separate relays.

Next, specific examples of control of the power conditioner system according to the present embodiment will be described with reference to FIG. 2 to FIG. 8. Note that the exemplary controls described below are executed by, for example, the power-storage control unit 61 in FIG. 1 upon detection of connection of the power-generation power conditioner 30, that is, upon connection between the independent output switch 34 of the power-generation power conditioner 30 and the AC link switch 55 of the power-storage power conditioner 50.

In FIG. 2 to FIG. 8, the grid 12 is represented by single-phase three-wire 200 V. In this case, each of the grid interconnection switch 33 of the power-generation power conditioner 30 and the grid interconnection switch 53 of the power-storage power conditioner 50 is connected to voltage lines. To the grid 12 of the single-phase three-wires, a general household load is connected. Also, in the examples, the independent output system 62 outputs an AC at 100 V and, to the independent outlets 63 and 64 of the independent output system 62, a TV (television receiver) 65 and a refrigerator 66 are connected as major loads.

In FIG. 2 to FIG. 8, further, the communication unit 35 and the power generation control unit 36 of the power-generation power conditioner 30 illustrated in FIG. 1 are omitted, and the synchronization detection unit 57, the voltage detection unit 58, the current detection unit 59, the communication unit 60 and the power-storage control unit 61 of the power-storage power conditioner 50 are also omitted. In FIG. 2 to FIG. 8, also, the load power output unit 56 of the power-storage power conditioner 50 is configured such that the independent output switch 54 and the AC link switch 55 are connected in series, a switch 71 is connected between in-series connection lines of the independent output switch 54 and the AC link switch 55 and the independent output system 62, and a switch 72 is connected between the grid 12 and the independent output system 62. Note that the switches 71, 72, in a manner similar to other switches, are turned on/off by respective relays.

Figure 2:
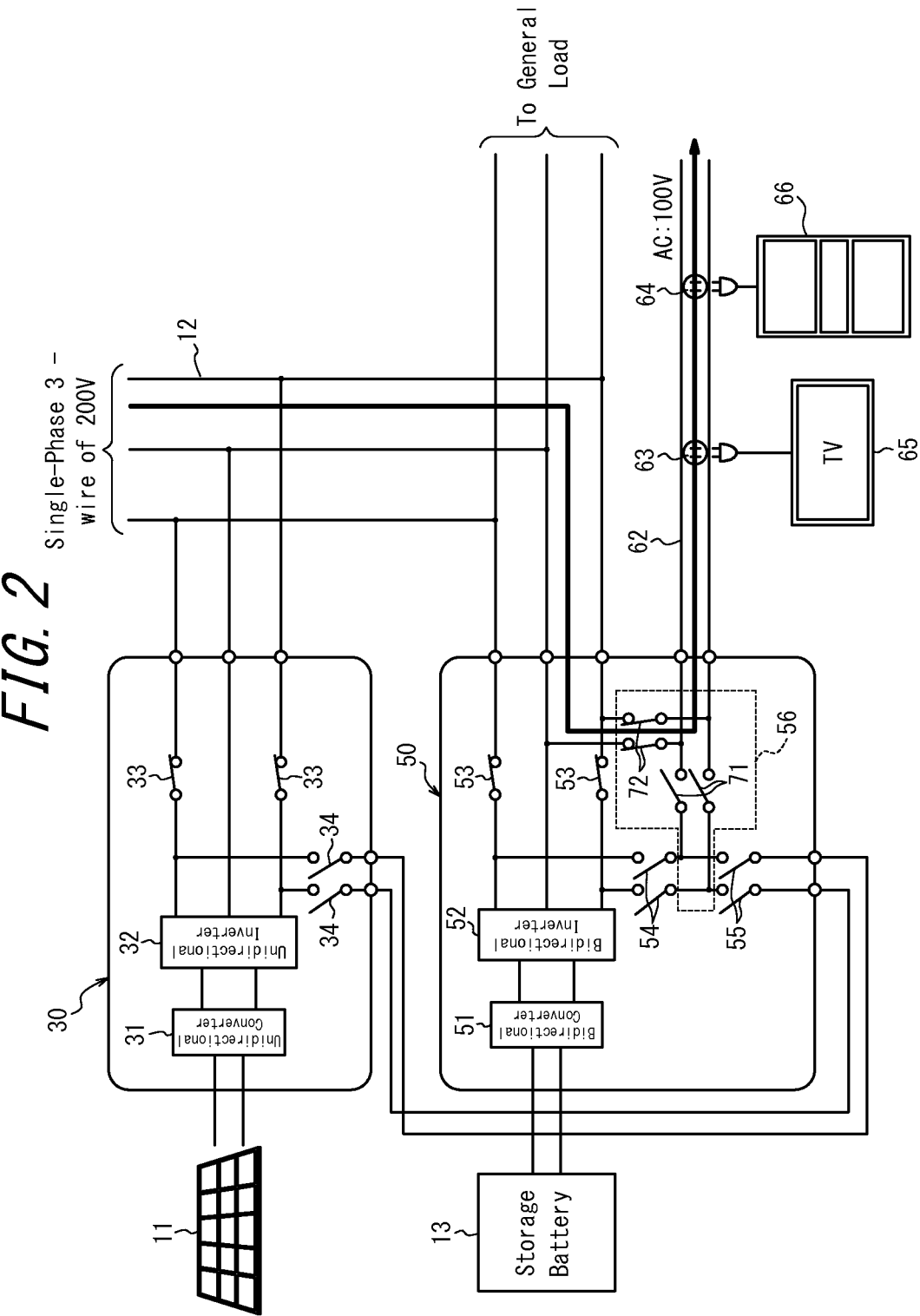
FIG. 2 is a diagram illustrating exemplary control carried out in normal operation by the power conditioner system in FIG. 1.

FIG. 2 is a diagram illustrating exemplary control carried out in normal operation. Here, the normal operation means an operation in a state where the grid 12 does not have power failure and there is no output suppression of the power-generation power conditioner 30. In this case, in the power-generation power conditioner 30 a control is conducted such that the grid interconnection switch 33 is turned on and the independent output switch 34 is turned off. Also, in the power-storage power conditioner 50 a control is conducted such that the grid interconnection switch 53 is turned on and the independent output switch 54 and the AC link switch 55 are turned off, and also such that the switch 71 of the load power output unit 56 is turned off and the switch 72 is turned on.

Thereby, to the independent output system 62, as indicated by a bold arrow, the AC at 100 V is supplied via the grid 12 and the switch 72 of the load power output unit 56 to the major loads, the TV 65 and the refrigerator 66. In the power-generation power conditioner 30, when a power generation amount of the power generation equipment 11 based on an intermediate link voltage detected by the power generation control unit 36 satisfies a predetermined power generation amount, the AC output from the unidirectional inverter 32 flows in reverse through the grid interconnection switch 33 to the grid 12, and thus excessive power is sold. In the power-storage power conditioner 50, also, when an amount of power stored in the power storage equipment 13 is under a predetermined power storage amount or when a predetermined time has come, the power storage equipment 13 is charged with the AC power of the grid 12 via the grid interconnection switch 53, the bidirectional inverter 52 and the bidirectional converter 51.

Figure 3:
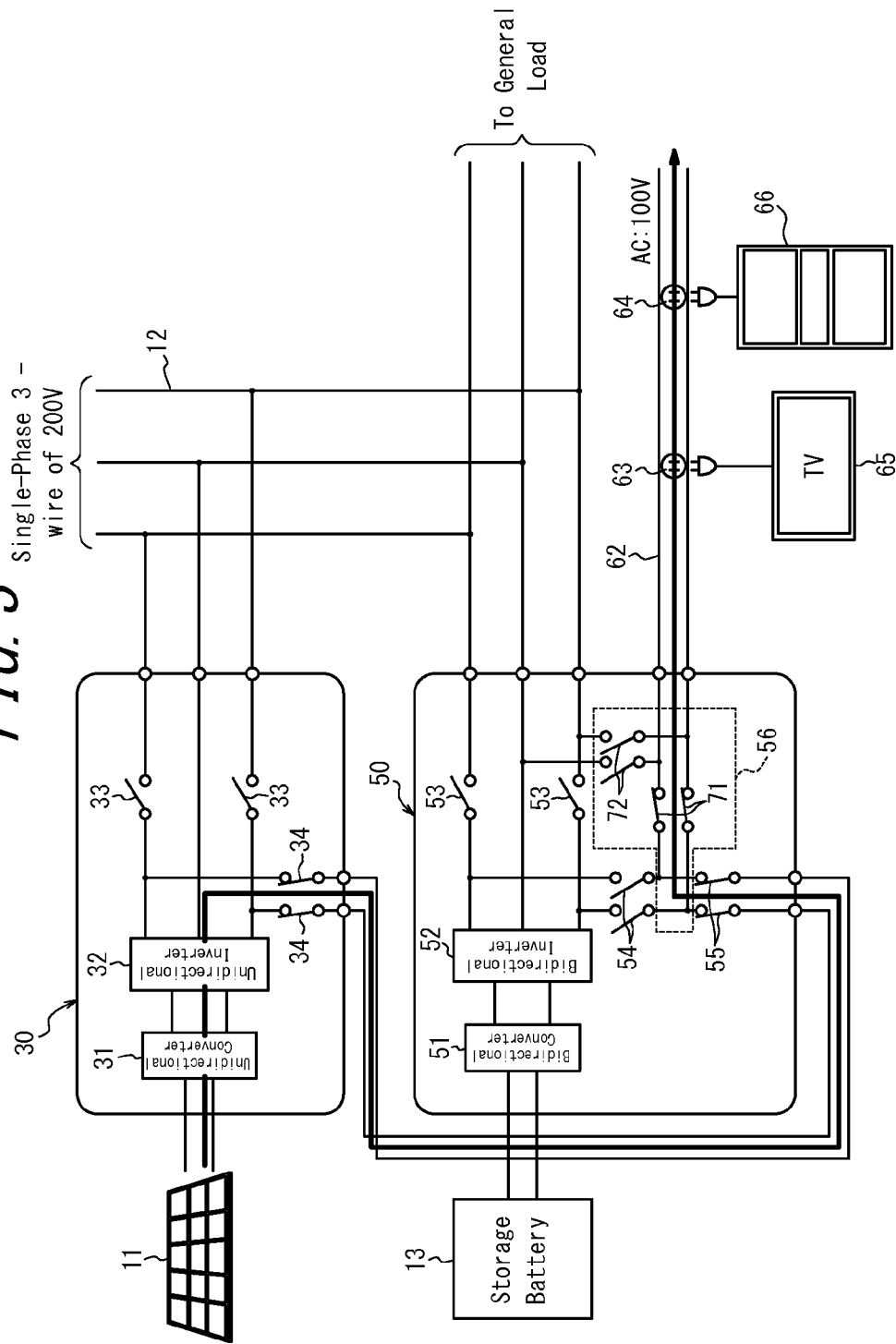
FIG. 3 is a diagram illustrating exemplary control carried out by the power conditioner system in FIG. 1 in case of the grid power failure in order to supply an AC link output of a power-generation power conditioner to an independent output system.

FIG. 3 is a diagram illustrating exemplary control carried out in case of the grid power failure in order to supply the AC link output of the power-generation power conditioner 30 to the independent output system 62. This exemplary control is carried out in case of power failure of the grid 12 when, for example, the power generation amount of the power generation equipment 11 satisfies the predetermined power generation amount. In this case, in the power-generation power conditioner 30 a control is conducted such that the grid interconnection switch 33 is turned off and the independent output switch 34 is turned on. Also, in the power-storage power conditioner 50 a control is conducted such that the grid interconnection switch 53 and the independent output switch 54 are turned off and the AC link switch 55 is turned on, and also such that the switch of the load power output unit 56 is turned on and the switch 72 is turned off.

Thereby, to the independent output system 62, as indicated by a bold arrow, the AC link output from the unidirectional inverter 32 of the power-generation power conditioner 30 via the independent output switch 34 is supplied through the AC link switch 55 and the load power output unit 56 of the power-storage power conditioner 50.

Figure 4:
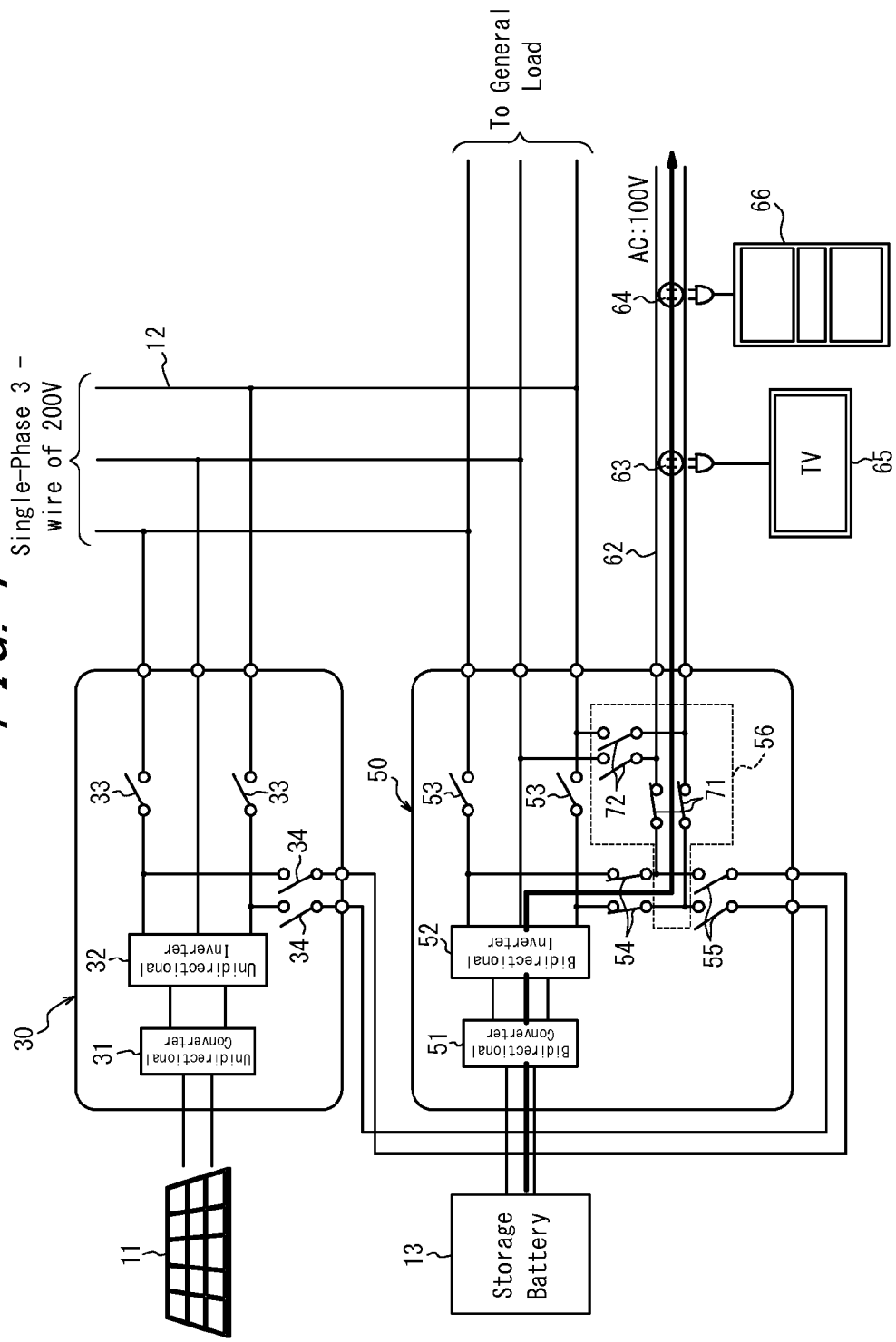
FIG. 4 is a diagram illustrating exemplary control carried out by the power conditioner system in FIG. 1 in case of the grid power failure in order to supply an independent output of a power-storage power conditioner to the independent output system.

FIG. 4 is a diagram illustrating exemplary control carried out in case of the grid power failure in order to supply an independent output of the power-storage power conditioner 50 to the independent output system 62. This exemplary control is carried out in case of power failure of the grid 12 when, for example, the power generation amount of the power generation equipment 11 does not satisfy the predetermined power generation amount and the amount of power stored in the power storage equipment 13 satisfies the predetermined power storage amount. In this case, in the power-generation power conditioner 30 a control is conducted such that the grid interconnection switch 33 and the independent output switch 34 are turned off. Also, in the power-storage power conditioner 50 a control is conducted such that the grid interconnection switch 53 and the AC link switch 55 are turned off and the independent output switch 54 is turned on, and also such that the switch 71 of the load power output unit 56 is turned on and the switch 72 is turned off.

Thereby, to the independent output system 62, as indicated by a bold arrow, an independent output from the bidirectional inverter 52 of the power-storage power conditioner 50 via the independent output switch 54 is supplied through the switch 71 of the load power output unit 56.

Figure 5:
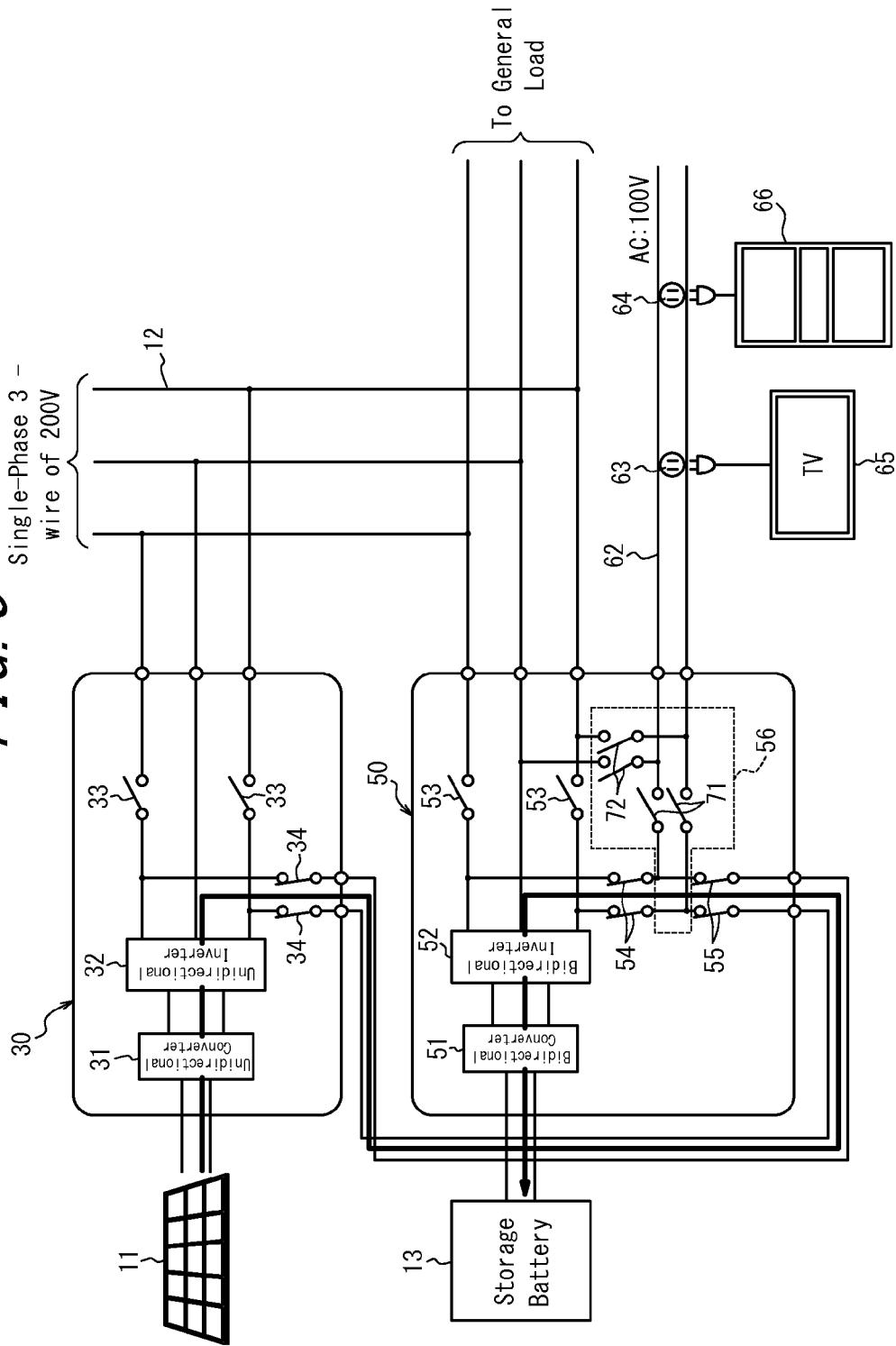
FIG. 5 is a diagram illustrating exemplary control carried out by the power conditioner system in FIG. 1 in case of the grid power failure in order to charge a power storage equipment with the AC link output of the power-generation power conditioner.

FIG. 5 is a diagram illustrating exemplary control carried out in case of the grid power failure in order to charge the power storage equipment 13 with the AC link output of the power-generation power conditioner 30. This exemplary control is carried out in case of power failure of the grid 12 when, for example, the power generation equipment 11 is in a power-generating state but the power generation amount thereof does not satisfy the predetermined power generation amount, and the amount of power stored in the power storage equipment 13 does not satisfy the predetermined power storage amount. In this case, in the power-generation power conditioner 30 a control is conducted such that the grid interconnection switch 33 is turned off and the independent output switch 34 is turned on. Also, in the power-storage power conditioner 50 a control is conducted such that the grid interconnection switch 53 is turned off and the independent output switch 54 and the AC link switch 55 are turned on, and also such that both of the switches 71, 72 of the load power output unit 56 are turned off.

Thereby, to the power storage equipment 13, as indicated by a bold arrow, the AC link output from the unidirectional inverter 32 of the power-generation power conditioner 30 via the independent output switch 34 is supplied through the AC link switch 55, the independent output switch 54, the bidirectional inverter 52, and the bidirectional converter 51 of the power-storage power conditioner 50. In this case, accordingly, the AC at 100 V is not supplied to the independent output system 62. Note that in this case the bidirectional inverter 52 and the bidirectional converter 51 of the power-storage power conditioner 50 are controlled by the power-storage control unit 61 based on the results of the detection of the AC link output by the synchronization detection unit 57, the voltage detection unit 58 and the current detection unit 59 illustrated in FIG. 1. Thereby, a charging amount of the power storage equipment 13 is controlled.

Figure 6:
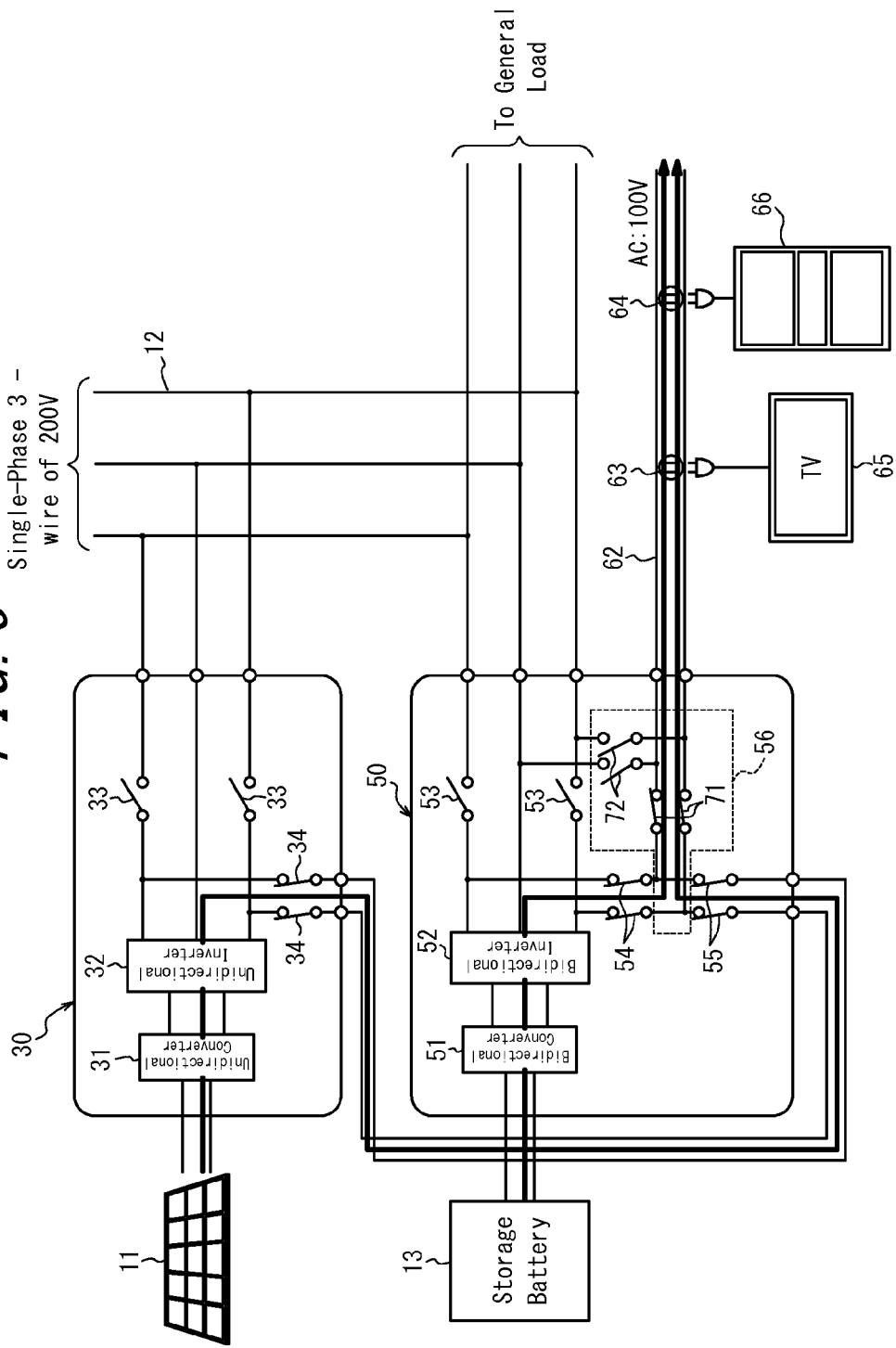
FIG. 6 is a diagram illustrating exemplary control carried out by the power conditioner system in FIG. 1 in case of the grid power failure in order to supply power, by combining the AC link output of the power-generation power conditioner and the independent output of the power-storage power conditioner, to the independent output system.

FIG. 6 is a diagram illustrating exemplary control carried out in case of the grid power failure in order to supply power, by combining the AC link output of the power-generation power conditioner 30 and the independent output of the power-storage power conditioner 50, to the independent output system 62. This exemplary control is carried out in case of power failure of the grid 12 when, for example, the AC link output alone of the power-generation power conditioner 30 does not satisfy power consumption of an major load connected to the independent output system 62, and the independent output of the power-storage power conditioner 50 may aid the shortage. In this case, in the power-generation power conditioner 30 a control is conducted such that the grid interconnection switch 33 is turned off and the independent output switch 34 is turned on. Also, in the power-storage power conditioner 50 a control is conducted such that the grid interconnection switch 53 is turned off and the independent output switch 54 and the AC link switch 55 are turned on, and also such that the switch 71 of the load power output unit 56 is turned on and the switch 72 is turned off.

Thereby, to the independent output system 62, as indicated by a bold arrow, the AC link output from the unidirectional inverter 32 of the power-generation power conditioner 30 via the independent output switch 34 is supplied through the AC link switch 55 of the power-storage power conditioner 50 and the switch 71 of the load power output unit 56. To the independent output system 62, also, the independent output from the bidirectional inverter 52 of the power-storage power conditioner 50 via the independent output switch 54 is supplied through the switch 71.

Note that in this case the bidirectional converter 51 and the bidirectional inverter 52 of the power-storage power conditioner 50 are controlled by the power-storage control unit 61 based on the results of the detection of the AC link output by the synchronization detection unit 57, the voltage detection unit 58 and the current detection unit 59 illustrated in FIG. 1. Thereby, the independent output of the power-storage power conditioner 50 is synchronized with the AC link output from the power-generation power conditioner 30, and controlled to be the power that is compensating the shortage of the output power by the AC link.

Figure 7:
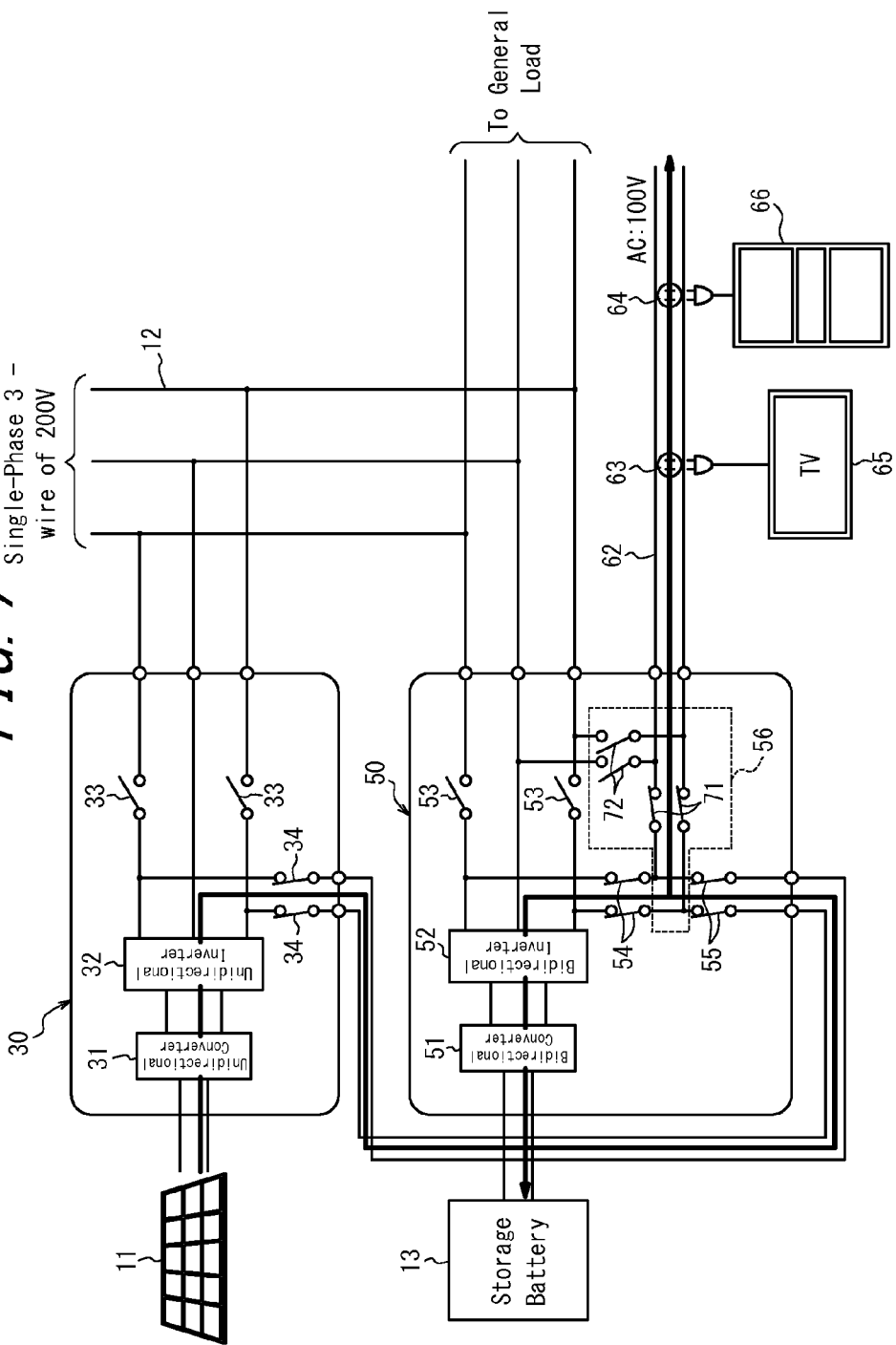
FIG. 7 is a diagram illustrating exemplary control carried out by the power conditioner system in FIG. 1 in case of the grid power failure in order to supply the AC link output of the power-generation power conditioner to the independent output system and to charge the power storage equipment with excess power of the AC link output.

FIG. 7 is a diagram illustrating exemplary control carried out in case of the grid power failure in order to supply the AC link output of the power-generation power conditioner 30 to the independent output system 62, and with excess output thereof, to charge the power storage equipment 13. This exemplary control is carried out in case of power failure of the grid 12 when, for example, the power generation amount of the power generation equipment 11 exceeds the power consumption of the major load connected to the independent output system 62, and the power storage equipment 13 may be charged. In this case, in the power-generation power conditioner 30 a control is conducted such that the grid interconnection switch 33 is turned off and the independent output switch 34 is turned on. Also, in the power-storage power conditioner 50 a control is conducted such that the grid interconnection switch 53 is turned off and the independent output switch 54 and the AC link switch 55 are turned on, and also such that the switch 71 of the load power output unit 56 is turned on and the switch 72 is turned off.

Thereby, to the independent output system 62, as indicated by a bold arrow, the AC link output from the unidirectional inverter 32 of the power-generation power conditioner 30 via the independent output switch 34 is supplied through the AC link switch 55 of the power-storage power conditioner 50 and the switch 71 of the load power output unit 56. Then, the excess of the AC link output exceeding the power consumption of the independent output system 62 is supplied to the power storage equipment 13 via the independent output switch 54, the bidirectional inverter 52 and the bidirectional converter 51, and thus the power storage equipment 13 is charged. Note that, in this case in a manner similar to FIG. 5, the bidirectional inverter 52 and the bidirectional converter 51 of the power-storage power conditioner 50 are controlled by the power-storage control unit 61 based on the results of the detection of the AC link output by the synchronization detection unit 57, the voltage detection unit 58 an the current detection unit 59 illustrated in FIG. 1. Thereby, charging of the power storage equipment 13 is controlled.

Figure 8:
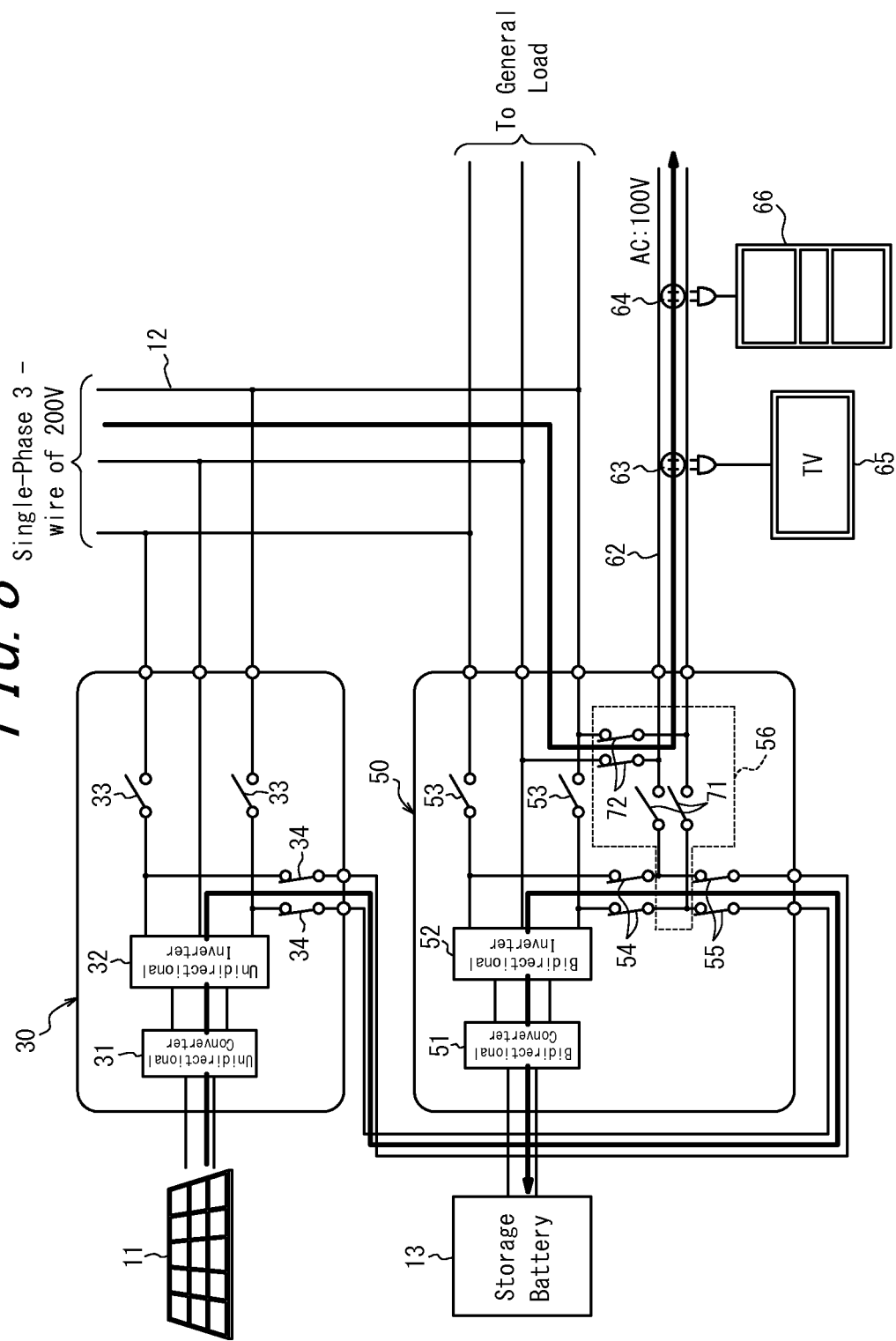
FIG. 8 is a diagram illustrating exemplary control carried out by the power conditioner system in FIG. 1 in order to suppress output from the power-generation power conditioner to the grid.

FIG. 8 is a diagram illustrating exemplary control carried out to suppress output of the power-generation power conditioner 30 to the grid 12. Here, the output suppression is executed upon increase in the grid voltage, upon entering date/time specified by a calendar function, or upon an offline instruction from the PCS communication. In this case, in the power-generation power conditioner 30 a control is conducted such that the grid interconnection switch 33 is turned off and the independent output switch 34 is turned on. Also, information pertinent to the output suppression of the power-generation power conditioner 30 is transmitted from the communication unit 35 to the power-storage power conditioner 50. When the communication unit 60 of the power-storage power conditioner 50 receives the information pertinent to the output suppression described above, in the power-storage power conditioner 50 a control is conducted such that the grid interconnection switch 53 is turned off and the independent output switch 54 and the AC link switch 55 are turned on, and also such that the switch 71 of the load power output unit 56 is turned off and the switch 72 is turned on.

Thereby, to the independent output system 62, as indicated by a bold arrow, the grid power of AC 100 V is supplied through the grid 12 and the switch 72 of the load power output unit 56. Also, when the power generation equipment 11 is in the power-generating state and the power storage equipment 13 may be charged, the AC link output from the power-generation power conditioner 30, in a manner similar to FIG. 5, is supplied to the power storage equipment 13 through the AC link switch 55, the independent output switch 54, the bidirectional inverter 52 and the bidirectional converter 51 of the power-storage power conditioner 50, and thus the charging amount of the power storage equipment 13 is controlled.

According to the present embodiment, as described above, unless the grid 12 has power failure, the grid power is supplied from the grid 12 to the independent output system 62 and, in case of power failure of the grid 12, the AC power is supplied from the power-generation power conditioner 30 and/or the power-storage power conditioner 50 to the independent output system 62. Accordingly, by connecting the major load to the independent output system 62, the major load may be supplied with power in case of the grid power failure, allowing elimination of the need for connection change of the major load. Further, since the power storage equipment 13 may be charged with the power generated by the power generation equipment 11 at the time of the output suppression of the power-generation power conditioner 30 to the grid 12, or at the time of the power failure of the grid 12, waste of power energy may be eliminated (Second Embodiment)

Figure 9:
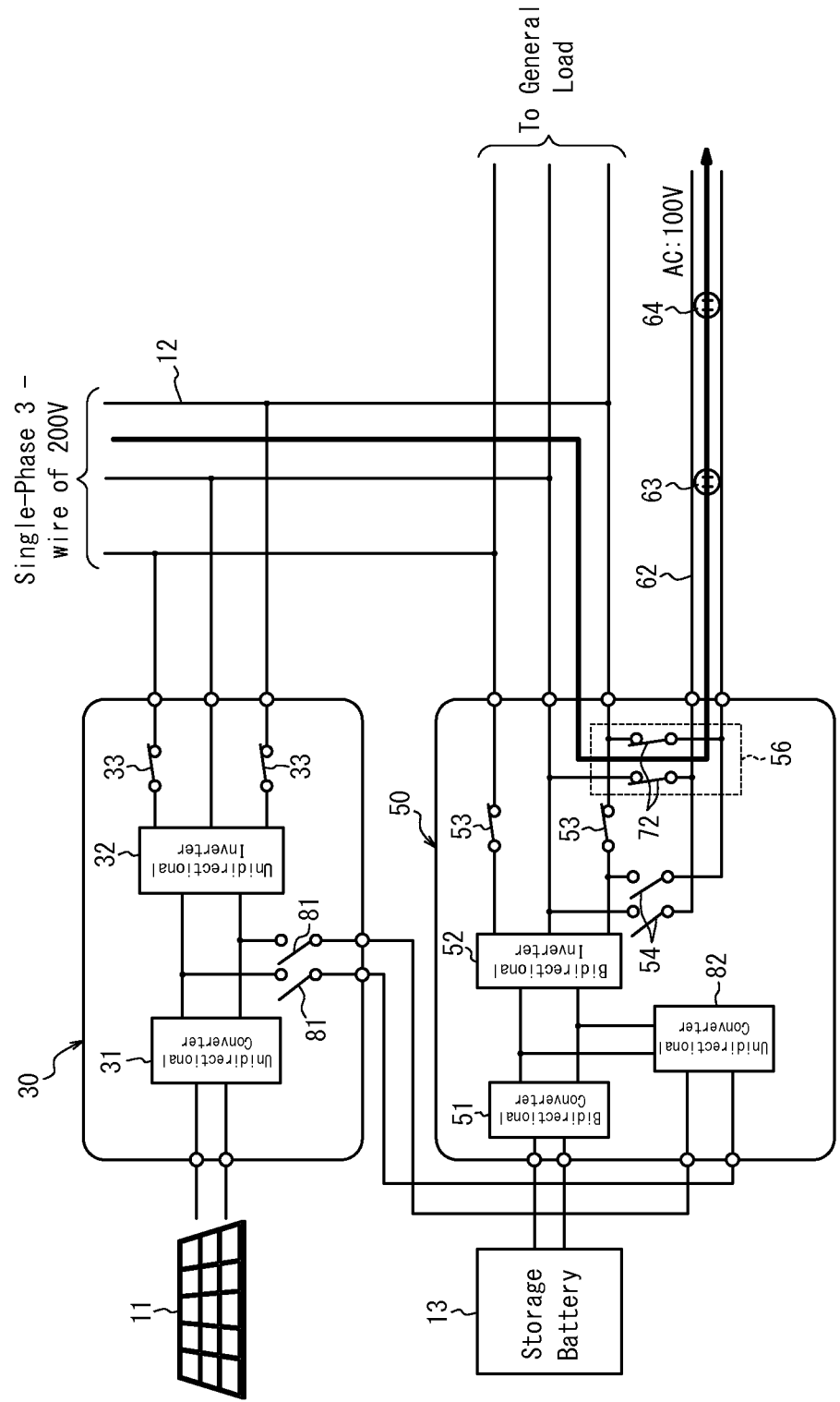
FIG. 9 is a diagram illustrating a section of a power conditioner system according to a second embodiment of the present invention.

FIG. 9 is a block diagram illustrating a schematic configuration of a section of a power conditioner system according to a second embodiment of the present invention. In the following description, components having the same effects as the components illustrated in FIG. 1 to FIG. 8 will be denoted with the same reference numerals. The power conditioner system according to the present embodiment has a configuration illustrated in FIG. 1, in which the DC power supplied from the unidirectional converter 31 of the power-generation power conditioner 30 to the unidirectional inverter 32 is selectively output, as a DC link output, from an independent output switch 81 corresponding to the independent-power-generation output unit to the power-storage power conditioner 50. Note that the independent output switch 81 serves also as a DC link switch. The independent output switch 81 may be replaced with a switch included in a section where the power is supplied to a unidirectional converter 82 described below.

The power-storage power conditioner 50 includes the unidirectional converter 82 for converting the DC link output from the power-generation power conditioner 30 into a DC current at a predetermined voltage and supplying the DC current to the bidirectional converter 51 and the bidirectional inverter 52. Note that the unidirectional converter 82 may be disposed after the independent output switch 81 in the power-generation power conditioner 30. Accordingly, the independent-power-generation input unit may be composed of an input unit or an output unit of the unidirectional converter 82. Also, the independent-power-generation input unit connects the independent output switch 54 for turning on/off AC output power of the bidirectional inverter 52 and the switch 72 (constituting the load power output unit 56) for turning on/off the grid power in parallel with the independent output system 62. Although other configurations are similar to that in FIG. 1, FIG. 9 omits the independent output switch 34, the AC link switch 55, the synchronization detection unit 57, the voltage detection unit 58, the current detection unit 59 and the like illustrated in FIG. 1.

The following is a description of more concrete examples of control of the power conditioner system according to the present embodiment. The following exemplary control is executed by the power-storage control unit 61 in FIG. 1 upon detection of, for example, connection of the power-generation power conditioner 30, that is, connection of the independent output switch 81 of the power-generation power conditioner 30 and the unidirectional converter 82 of the power-storage power conditioner 50.

FIG. 9 is a diagram illustrating exemplary control in normal operation. In this case, in the power-generation power conditioner 30 a control is conducted such that the grid interconnection switch 33 is turned on and the independent output switch 81 is turned off. Also, in the power-storage power conditioner 50 a control is conducted such that the grid interconnection switch 53 is turned on and the independent output switch 54, and also such that the switch 72 of the load power output unit 56 is turned on.

Thereby, in a manner similar to FIG. 2, the AC voltage at 100 V is supplied to the independent output system 62 from the grid 12 via the switch 12. In the power-generation power conditioner 30, when the power generation amount of the power generation equipment 11 satisfies the predetermined power generation amount, the AC output from the unidirectional inverter 32 is flown in reverse to the grid 12 via the grid interconnection switch 33, and thus becomes sellable power. In the power-storage power conditioner 50, on the other hand, when the amount of power stored in the power storage equipment 13 does not satisfy the predetermined power storage amount, the power storage equipment 13 is charged with the AC power of the grid 12 via the grid interconnection switch 53, the bidirectional inverter 52 and the bidirectional converter 51.

Figure 10:
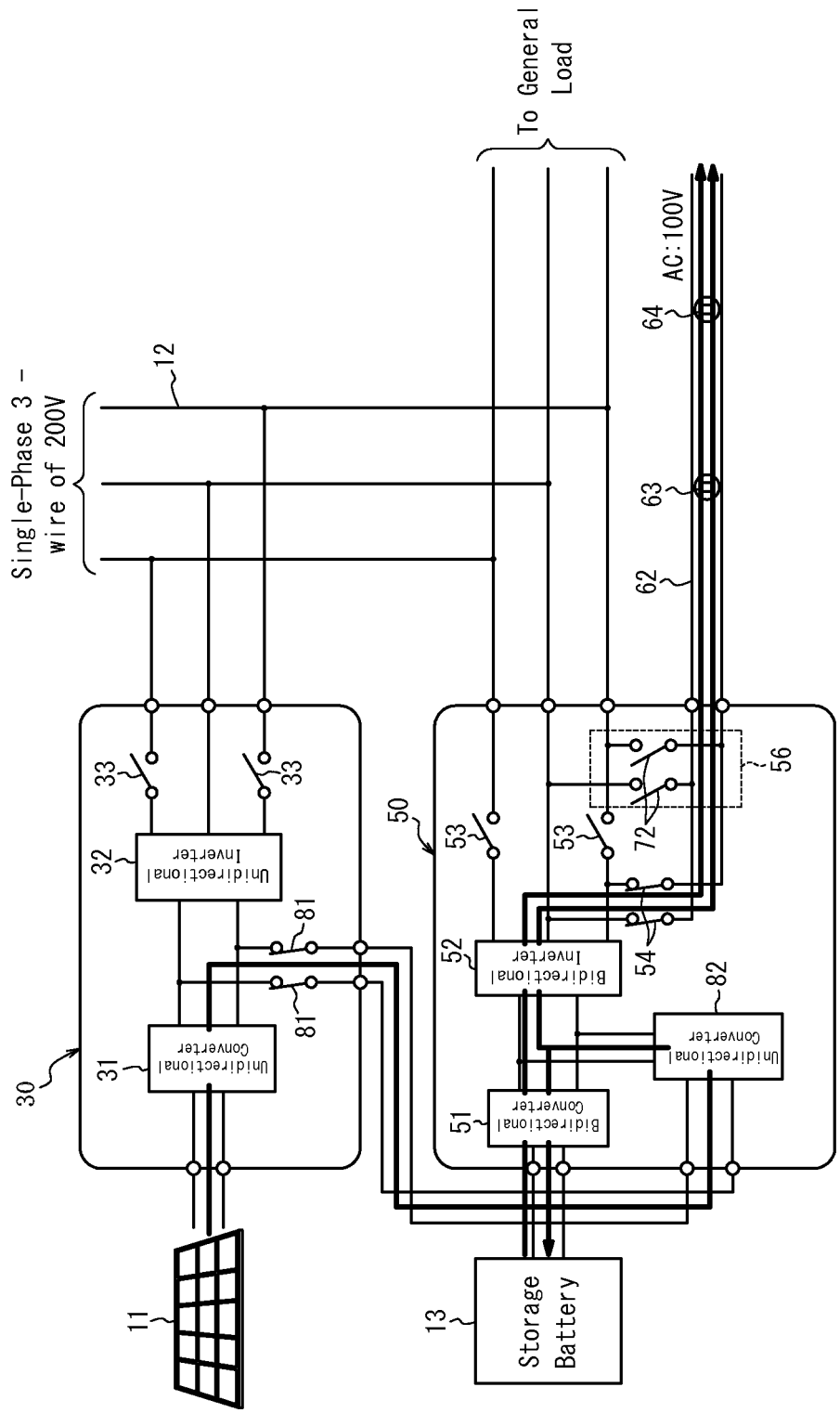
FIG. 10 is a diagram illustrating exemplary control carried out by the power conditioner system in FIG. 9 in case of the grid power failure.

FIG. 10 is a diagram illustrating exemplary control carried out in case of the grid power failure. In this case, in the power-generation power conditioner 30 a control is conducted such that the grid interconnection switch 33 is turned off and the independent output switch 81 is turned on. Also, in power-storage power conditioner 50 a control is conducted such that the grid interconnection switch 53 is turned off and the independent output switch 54 is turned on, and also such that the switch 72 of the load power output unit 56 is turned off.

Then, when there is sufficient power generation amount of the power generation equipment 11, the DC link output from the power-generation power conditioner 30 is boosted by the unidirectional converter 82 and then supplied to the bidirectional inverter 52. To the independent output system 12, then, the AC voltage from the bidirectional inverter 52 is supplied via the independent output switch 54. At this time, when the power storage equipment 13 may be charged, the excess of the DC power from the unidirectional converter 82 is supplied to the power storage equipment 13 via the bidirectional converter 51, and thus the power storage equipment 13 is charged. At this time, preferably, the power-generation power conditioner 30 or the power-storage power conditioner 50 detects the DC link output and, based on results of the detection, controls a charging amount of the power storage equipment 13.

On the other hand, when the power generation amount of the power generation equipment 11 does not satisfy the power consumption of the independent output system 62, in order to compensate the shortage, a stored-power output from the power storage equipment 13 is supplied to the bidirectional inverter 52 via the bidirectional converter 51. Thereby, the AC power satisfying the power consumption is supplied to the independent output system 62. Also, when the power generation equipment 11 is not in the power-generating state, a DC independent output from the bidirectional inverter 52 output based on the stored-power output of the power storage equipment 13 is supplied to the independent output system 62 via the independent output switch 54.

Figure 11:
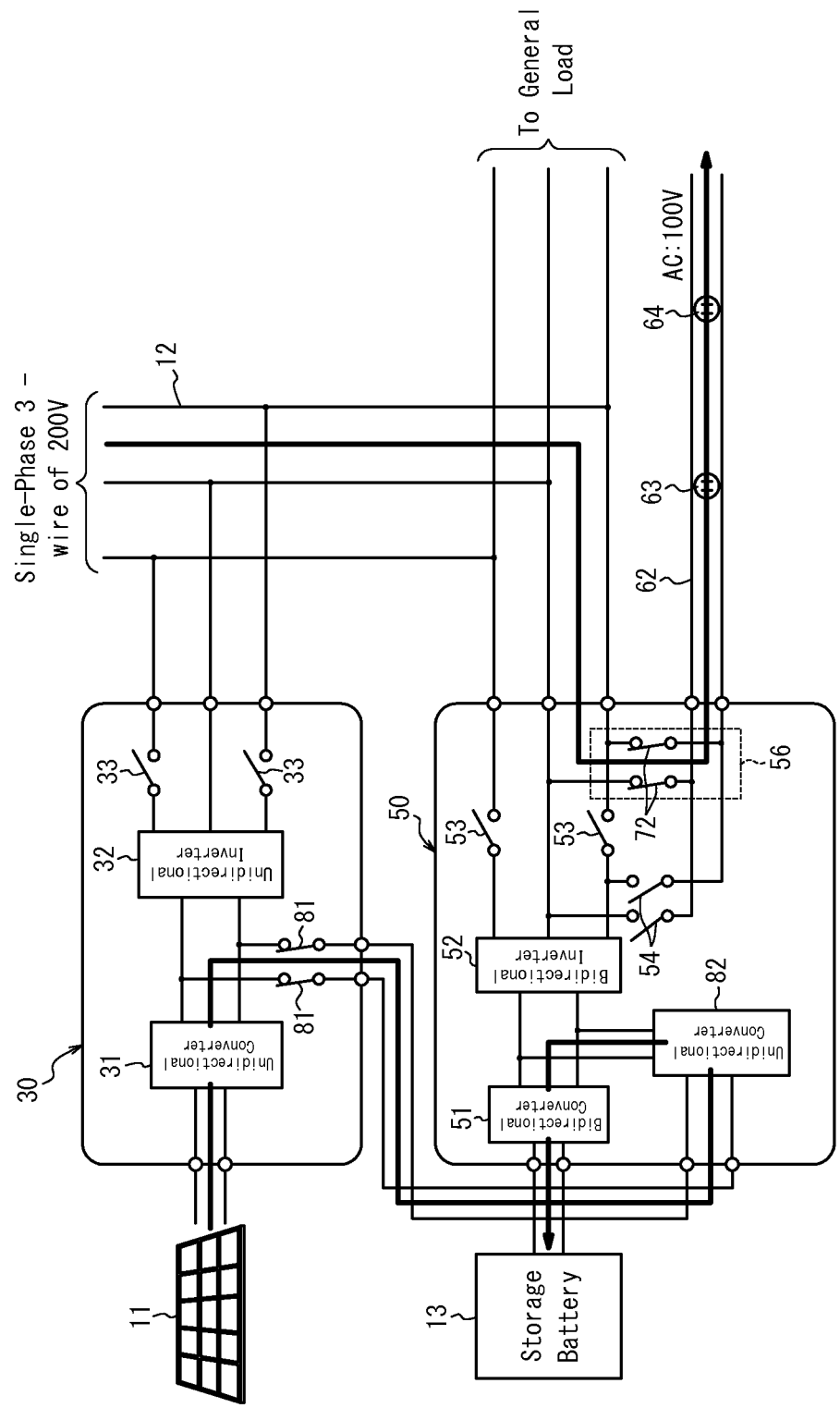
FIG. 11 is a diagram illustrating exemplary control carried out by the power conditioner system in FIG. 9 in order to suppress output from the power-generation power conditioner to the commercial power supply system.

FIG. 11 is a diagram illustrating exemplary control carried out in order to suppress output of the power-generation power conditioner 30 to the grid 12. In this case, in the power-generation power conditioner 30 a control is conducted such that the grid interconnection switch 33 is turned off and the independent output switch 81 is turned on. Also, in the power-storage power conditioner 50 a control is conducted such that the grid interconnection switch 53 and the independent output switch 54 are turned off, and also such that the switch 72 of the load power output unit 56 is turned on.

To the independent output system 62, thereby, the grid power of AC 100 V is supplied from the grid 12 via the switch 72 of the load power output unit 56. Also, when the power generation equipment 11 is in the power-generating state, and the power storage equipment 13 may be charged, the DC link output from the power-generation power conditioner 30 is supplied to the power storage equipment 13 through the independent output switch 81, the unidirectional converter 82 and the bidirectional converter 51 of the power-storage power conditioner 50, and thus the power storage equipment 13 is charged. In this case also, preferably, the power-generation power conditioner 30 or the power-storage power conditioner 50 detects the DC link output and, based on results of the detection, controls the charging amount of the power storage equipment 13.

According to the present embodiment also, therefore, in a manner similar to the first embodiment, by connecting the major load to the independent output system 62, the major load may be powered regardless of the grid power failure, which eliminates the necessity of the connection change of the major load. Also, when the output of the power-generation power conditioner 30 to the grid 12 is suppressed or when the grid 12 has the power failure, the power generated by the power generation equipment 11 may be stored in the power storage equipment 13, thereby eliminating waste of the power energy.

Note that the present invention is not limited to the above embodiments but various modifications and changes may be made. For example, some functions of the communication units 35, 60 illustrated in FIG. 1 may be omitted when, for example, an output suppression interconnection function is eliminated. In the first embodiment, also, the synchronization detection unit 57, the voltage detection unit 58 and the current detection unit 59 of the power-storage power conditioner 50 for detecting the AC link output may be omitted when some control algorithm or system configurations are used. In the first embodiment, moreover, the independent output switch 34 of the power-generation power conditioner 30 may be omitted while an output terminal of the AC link output is used as the independent-power-generation output unit.

In the second embodiment, also, the independent output switch 81 of the power-generation power conditioner 30 may be disposed in the power-storage power conditioner 50 to be used as the DC link switch while the power-generation power conditioner 30 uses an output terminal of the DC link output as the independent-power-generation output unit. In the second embodiment, moreover, when the output voltage from the unidirectional converter 31 of the power-generation power conditioner 30 exceeds the output voltage from the bidirectional converter 51 of the power-storage power conditioner 50 to the bidirectional inverter 52, the unidirectional converter 82 of the power-storage power conditioner 50 may be omitted. Further, the present invention is not limited to the solar panels but also applicable when the power generation equipment 11 is another power generation equipment such as a wind power generation equipment and the like. Similarly, the present invention is also applicable when the power storage equipment 13 is not the battery but another storage equipment such as an electric double layer capacitor or the like.

REFERENCE SIGNS LIST 11 power generation equipment
12 grid
13 power storage equipment
30 power-generation power conditioner
31 unidirectional converter
32 unidirectional inverter
33 system interconnection switch
34 independent output switch
35 communication unit
36 power-generation control unit
50 power-storage power conditioner
51 bidirectional converter
52 bidirectional inverter
53 system interconnection switch
54 independent output switch
55 AC link switch
56 load power output unit
57 synchronization detection unit
58 voltage detection unit
59 current detection unit
60 communication unit
61 power-storage control unit
62 independent output system
71, 72 switch
81 independent output switch
82 unidirectional converter

The invention claimed is:

1. A power conditioner system comprising:
a power-generation power conditioner configured to connect a power generation equipment to a grid; and
a power-storage power conditioner configured to connect a power storage equipment to the grid,
wherein
the power-generation power conditioner includes an independent power-generation output unit configured to output, separately from power supply to the grid, power based on generated power of the power generation equipment,
the power-storage power conditioner includes an independent-power-storage output unit configured to output, separately from power supply to the grid, power based on stored power in the power storage equipment, and the power-storage power conditioner supplies at least one of AC power based on the output power of the independent-power-generation output unit, AC power based on the output power of the independent-power-storage output unit, and system power of the grid, to an independent output system having a predetermined load connected thereto.

2. The power conditioner system according to claim 1, wherein the power-storage power conditioner further includes an independent-power-generation input unit configured to input power supplied from the independent-power-generation output unit, and the power-storage power conditioner utilizes the power supplied from the independent-power-generation input unit for power storage of the power-storage power conditioner or for power supply to the independent-power-storage output unit.

3. The power conditioner system according to claim 1, wherein the power-generation power conditioner and the power-storage power conditioner include respective communication units for transmitting and receiving information including an operation state.

4. The power conditioner system according to claim 1, wherein the power-storage power conditioner charges the power storage equipment based on the output power of the independent-power-generation output unit.

5. The power conditioner system according to claim 1, wherein the power-storage power conditioner, when supplying AC power based on the output power of the independent-power-generation output unit to the independent output system and the AC power is smaller than power consumption of the independent output system, compensates such a shortage with the AC power based on the output power of the independent-power-storage output unit.

6. The power conditioner system according to claim 1, wherein the power-storage power conditioner, when supplying the AC power based on the output power of the independent-power-generation output unit to the independent output system and the AC power exceeds the power consumption of the independent output system, stores such an excess in the power storage equipment.

7. The power conditioner system according to claim 3, wherein the power-generation power conditioner, at the time of suppression of output to the grid, makes itself offline from the grid and outputs power based on generated power of the power generation equipment from the independent-power-generation output unit and transmits information pertinent to the output suppression from the communication unit of the power-generation power conditioner to the power-storage power conditioner.

8. The power conditioner system according to claim 7, wherein the power-storage power conditioner, when the communication unit thereof receives the information pertinent to the output suppression from the power-generation power conditioner, makes itself offline from the grid and stores the output power of the independent-power-generation output unit in the power storage equipment.

9. The power conditioner system according to claim 7, wherein the power-generation power conditioner is subjected to output suppression upon increase in a system voltage of the grid, upon entering date/time designated by a calendar function, or upon an offline instruction received by the communication unit of the power-generation power conditioner itself.

10. The power conditioner system according to claim 3, wherein the power-generation power conditioner, when making itself offline from the grid, transmits information including the operation state from the communication unit thereof to the power-storage power conditioner and outputs power based on generated power of the power generation equipment from the independent-power-generation output unit.

11. The power conditioner system according to claim 3, wherein
the power-generation power conditioner transmits information about power based on the generated power of the power generation equipment from the communication unit thereof to the power-storage power conditioner, and
the power-storage power conditioner, when the communication unit thereof receives the information about the power based on the generated power of the power generation equipment from the power-generation power conditioner, controls a charging amount of the power storage equipment based on the received information.

12. The power conditioner system according to any one of claims 1, wherein the power-storage power conditioner, when detecting connection of the independent-power-generation output unit to the power-storage power conditioner, supplies at least one of the AC power based on the output power of the independent-power-generation output unit, the AC power based on the output power of the independent-power-storage output unit, and the system power of the grid, to a predetermined independent output system.

* * * * *